(12) United States Patent
Nakanishi

(10) Patent No.: US 6,911,192 B2
(45) Date of Patent: Jun. 28, 2005

(54) METHOD FOR PREPARING INORGANIC POROUS MATERIAL

(75) Inventor: Kazuki Nakanishi, Kyoto (JP)

(73) Assignee: Japan Science and Technology Agency, Saitama (JP)

( * ) Notice: Subject to any disclaimer, the term of this patent is extended or adjusted under 35 U.S.C. 154(b) by 23 days.

(21) Appl. No.: 10/481,231

(22) PCT Filed: Jun. 28, 2002

(86) PCT No.: PCT/JP02/06536

§ 371 (c)(1),
(2), (4) Date: Dec. 16, 2003

(87) PCT Pub. No.: WO03/002458

PCT Pub. Date: Jan. 9, 2003

(65) Prior Publication Data

US 2005/0063890 A1 Mar. 24, 2005

(30) Foreign Application Priority Data

Jun. 29, 2001 (JP) .......................................... 2001-197717

(51) Int. Cl.[7] .............................................. C01B 33/12
(52) U.S. Cl. ....................................... 423/338; 423/335
(58) Field of Search ................................. 423/335, 338, 423/333; 264/41, 42

(56) References Cited

U.S. PATENT DOCUMENTS

| | | | | |
|---|---|---|---|---|
| 5,112,589 A | * | 5/1992 | Johnson et al. | 423/705 |
| 5,250,282 A | * | 10/1993 | Kresge et al. | 423/705 |
| 5,304,363 A | * | 4/1994 | Beck et al. | 423/328.1 |
| 5,840,271 A | * | 11/1998 | Carrazza et al. | 423/700 |
| 6,054,111 A | * | 4/2000 | Antonietti et al. | 423/702 |
| 6,174,512 B1 | * | 1/2001 | Kosuge et al. | 423/705 |
| 6,203,925 B1 | * | 3/2001 | Attard et al. | 428/613 |
| 6,548,440 B1 | * | 4/2003 | Pham et al. | 502/71 |
| 6,669,924 B1 | * | 12/2003 | Kaliaguine et al. | 423/702 |
| 6,696,258 B1 | * | 2/2004 | Wei et al. | 435/7.2 |
| 6,716,378 B2 | * | 4/2004 | Yang et al. | 264/42 |

* cited by examiner

Primary Examiner—Colleen P. Cooke
(74) Attorney, Agent, or Firm—Fay, Sharpe, Fagan, Minnich & McKee, LLP

(57) ABSTRACT

Disclosed is a method for producing an inorganic porous body having precisely controlled macropores concurrently with mesopores of a narrow pore size distribution. The method comprises dissolving an amphiphilic substance as template component in an aqueous solution containing a sol-gel reaction catalyst, adding an inorganic low molecular weight compound having hydrolysable functional groups to the solution, forming a gel including a solvent-rich phase for the macropores, drying the gel to remove the solvent, and removing the template component by such means as thermal decomposition.

3 Claims, 3 Drawing Sheets

METHOD FOR PREPARING INORGANIC POROUS MATERIAL

TECHNICAL FIELD

This invention relates to a novel method for producing an inorganic porous body. The method of the present invention is suitably applied to the production of porous bodies for use as packing materials for chromatography, porous bodies for blood separation, porous bodies for moisture absorption, deodorizing porous bodies for low molecular substance adsorption, porous bodies for enzyme or catalyst supports and the like.

BACKGROUND ART

As porous materials for use in the above-mentioned applications, there have been hitherto known those which are composed of organic polymers such as styrene-divinylbenzene copolymers, as well as those which are composed of inorganic materials such as silica gel. In use, they are generally packed in the form of a column.

The organic material columns have disadvantages such as that they have low mechanical strength against applied pressure, they easily swell or shrink when exposed to solvents, and they cannot be sterilized by heating. Thus, in cases where increased productivities are required by operation at high temperatures, the general practice is to use inorganic materials, particularly silica gel, because they do not suffer from such disadvantages.

Inorganic porous materials, such as silica gel are generally produced by the sol-gel process, which is a liquid phase reaction. As well known, the sol-gel process refers to a general process for producing aggregates or polymers of an oxide from an inorganic low molecular weight compound, in which the inorganic low molecular weight compound having hydrolysable functional groups for use as the starting materials is subjected to a sol-gel reaction, i.e., a hydrolysis and subsequently a polymerization reaction (polycondensation). The best known inorganic low molecular weight compounds for use as the starting materials are metal alkoxides. Other examples include metal chlorides, metal salts or coordination compounds having a hydrolysable functional group such as carboxyl group or β-diketone, and metal amines.

For use as a carrier for various purposes, a porous material should have an optimal median pore size as well as the narrowest pore size distribution suitable for the specific substance which is to be carried on the surface of the porous material for exhibiting the desired function. Thus, for a porous material produced by the sol-gel process, attempts have been made to control the pore size through controlling of the reaction conditions for the gel preparation.

Recently, a number of researchers have reported that the preparation of a porous material by the sol-gel process in the presence of an amphiphilic substance such as a surfactant or a block copolymer (more strictly, a molecular assembly of such amphiphilic substance formed through the self-organization) as a template makes it possible to precisely control pore structures in the nanometer range. However, conventional porous bodies produced by such sol-gel process generally have only nanometer-size pores (i.e., so-called mesopores), in which the bodies are mostly in the form of powder, thin films or irregular particles. Even if the porous bodies are produced in the form of a bulk material, no examples are found where larger-scale pores (i.e., so-called macropores) are controllably coexistent.

It is known that a sol-gel reaction for preparing silica gel using a basic catalyst, in the presence of an amide compound or from a silicon alkoxide as the starting material, will result in the enlargement of the average pore diameter. However, the resultant material has only pores of 20 nanometers, even at the largest, and a pore-size distribution in which most of the pores extend to the smaller diameter region.

In use as filters, carriers and other applications, the porous materials having only nanometer-sized pores (mesopores) as described above are generally pulverized and then packed in a column, in which the pulverized particles may be bonded together. Thus, the substance to be treated (i.e., the gas or liquid as the mobile phase) enters into the mesopores, through the spaces formed among the pulverized or bonded particles, in order to establish a desired function by the porous materials. However, many cases are known where the desired function is not fully exhibited because of insufficient porosity as well as the irregular or nonuniform spaces formed by the porous materials. A complicated and time-consuming process is required to produce a porous assembly by which a target substance can be smoothly introduced into nanometer-sized pores (mesopores) for contact therewith, or a bulk material having a macropores structure satisfying such condition.

It is an object of the present invention to provide a new method for producing inorganic porous bodies having precisely controlled macropores concurrently with mesopores of a narrow pore size distribution.

DISCLOSURE OF THE INVENTION

The present inventors have found that the above-mentioned object is achieved by producing an inorganic porous body by a sol-gel process in the presence of an amphiphilic substance as the template component, under the conditions where the sol-gel transition occurs simultaneously with the phase-separation.

Thus, according to the present invention, there is provided a method for producing an inorganic porous body having macropores concurrently with mesopores, which comprises the steps of:

(i) preparing a homogeneous solution by dissolving an amphiphilic substance as template component in an aqueous solution containing a sol-gel reaction catalyst, (ii) adding an inorganic low molecular weight compound having hydrolyzable functional groups to said homogeneous solution so as to cause a sol-gel reaction, thereby forming a gel of a continuous three-dimensional network structure composed of a solvent-rich phase which is rich in the solvent and a skeleton phase which is rich in an inorganic oxide polymer adhered to the surface of the amphiphilic substance template wherein the inorganic oxide polymer is produced from said inorganic low molecular weight compound by the sol-gel reaction, (iii) drying said gel to remove the solvent from the solvent-rich phase by evaporation, thereby forming the macropores, and (iv) removing said template component from the dried gel by thermal decomposition or extraction, thereby forming the mesopores within the skeleton phase.

THE BEST MODE FOR CARRYING OUT THE INVENTION

Figure 1:
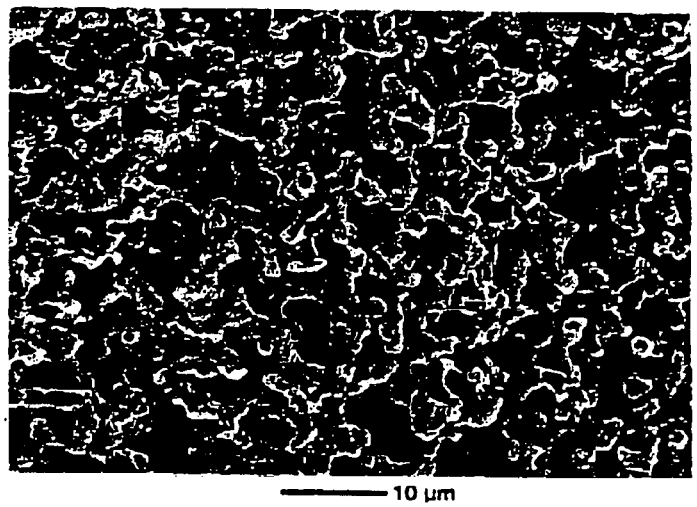
FIG. 1 shows a scanning electron microscopic photograph of the structure obtained by the removal of the solvent by evaporation after the sol-gel reaction step in Example 1.

The method of the present invention relates to the production of an inorganic porous body by a sol-gel process in the presence of an amphiphilic substance as the template component, and is characterized in that it includes the step of forming a gel composed of a solvent-rich phase, from which macropores will form in the subsequent step of drying, and a skeleton phase, from which mesopores will form within the phase in the subsequent step of thermal decomposition or extraction, by adjusting the reaction conditions so that the sol-gel transition and the phase-separation occur concurrently. By contrast, according to conventional methods for producing porous bodies by a sol-gel process in the presence of an amphiphilic substance as the template, the resultant porous bodies have only mesopores as mentioned previously. This is probably because, in the conventional methods, the oxide polymer forms too quickly and locally on the surface of the template and precipitates to be separated out of the system.

The terms "macropore" and "mesopore" as used herein are defined in accordance with the well-known proposal by IUPAC. Thus, a macropore refers to a pore having a diameter of larger than 50 nanometers while a mesopore refers to a pore having a size between macropores and micro pores (having a diameter of less than 2 nanometers), i.e., a pore having a diameter of 2 to 50 nanometers. The porous body produced by the present invention generally has mesopores with a narrow pore size distribution primarily in the range of 2 to 10 nanometers.

While the principle of the present invention can be applied to a variety of inorganic low molecular weight compounds from which there are formed oxide polymers by the sol-gel process as described previously in reference to the background art, the present invention is most suitably applied to cases where the inorganic oxide polymer for composing the porous body is silica (silica polymer) and/or a polymer of siloxane having an organic functional group or groups.

In producing a porous body composed of silica and/or siloxane polymer and concurrently having mesopores and macropores in accordance with the present invention, it is necessary to adjust the conditions for sol-gel reaction in such manner that the sol-gel reaction proceeds under an acidic condition at least during the initial stage of the reaction and that the quantity of the water containing the catalyst is in the range of 2.0 to 40.0 g per 1.0 g of silica (in terms of anhydrous silica) in the reaction system. By such adjustment it is assured that the sol-gel transition and the phase-separation occur concurrently to result in the formation of the gel composed of the solvent-rich phase and the skeleton phase.

More specifically, it is known that, in the preparation of a porous body mainly composed of silica by a sol-gel reaction using an amphiphilic substance as a template, there can be formed uniformly-sized mesopores due to the template under any of acidic, neutral or basic catalyst condition. However, for the production of the gel separately composed of the solvent-rich phase and the skeleton phase in accordance with the present invention, the sol-gel reaction has to be conducted under an acidic condition where uniform hydrolysis and gel formation occur easily.

Uniform hydrolysis and gel formation can also be induced through a homogeneous reaction taking place inside the reaction solution so that the liquid property, which was acidic at the initial stage of the reaction, is gradually converted to basic (for example, by adding urea to the reaction solution so that the urea will be hydrolyzed to produce ammonia).

A sol-gel reaction involves the formation of binding sites (the sites for polycondensation: typically, hydroxyl groups) through hydrolysis, and the formation of gel through the polycondensation reaction at the binding sites. It is considered that under an acidic condition the hydrolysis is promoted so as to form a number of the polycondensation sites, through which the polycondensation reaction (the gel formation) proceeds uniformly. By contrast, in a case where a sol-gel reaction proceeds under a basic condition even from the initial stage of reaction, the polycondensation is promoted rather than the hydrolysis, which will induce a nonuniform gel formation. Catalysts for use in the sol-gel reaction include, but are not limited to, a mineral acid such as hydrochloric acid, nitric acid or sulfuric acid, an organic acid such as acetic acid or citric acid, a weak base such ammonia or amines, or a strong base such as sodium hydroxide or potassium hydroxide, in which controlling the liquid property for the reaction is more important than the type of the catalyst.

Water content in the sol-gel reaction is another important factor in producing a porous body composed of silica or siloxane polymer and concurrently having mesopores and macropores in accordance with the present invention. The quantity of water containing the catalyst should be in the range of 2.0 to 40.0 g, preferably 3.0 to 20.0 g, more preferably 4.0 to 10.0 g per 0.0167 moles of silicon atom (i.e., 1.0 g calculated in terms of anhydrous silica). An excess amount of water will result in the precipitation of polymers having an insufficient degree of polymerization into the water without uniform gel formation. This is in contrast to the fact that, in the conventional method of producing porous bodies having only mesopores, by means of a sol-gel process in the presence of an amphiphilic substance as the template, the water content as defined in the above is generally more than 50 g, and in some cases, more than 100 g.

Thus, according to the present invention, a sol-gel reaction process is controlled in such manner that the sol-gel transition and the phase separation occur substantially concurrently, thereby forming a gel composed of a solvent-rich phase which is rich in the solvent (water) and a skeleton phase which is rich in the oxide polymer, wherein such formation is ascertained by the fact that the solution becomes turbid without giving rise to any precipitation. The gel product further solidifies when aged for some time (while being slightly warmed if necessary). The resultant gel is then subjected to drying and thermal decomposition (or extraction) to produce a desired porous body.

The method of the present invention for producing an inorganic porous body concurrently having mesopores and macropores thus starts with the step of preparing a homogeneous solution by dissolving an amphiphilic substance as template component into an aqueous solution containing a sol-gel reaction catalyst. When an inorganic low molecular weight compound having hydrolysable functional groups is added to the homogeneous solution so as to cause a sol-gel reaction, there is formed a gel composed of separate phases of a solvent-rich phase and a skeleton phase as described in the preceding.

The solvent-rich phase is a continuous three-dimensional network phase having a width corresponding to a macropore diameter. This can be ascertained by the microscopic observation of the structure produced after removing the solvent by drying, as will be described later (cf. FIG. 1).

Figure 2:
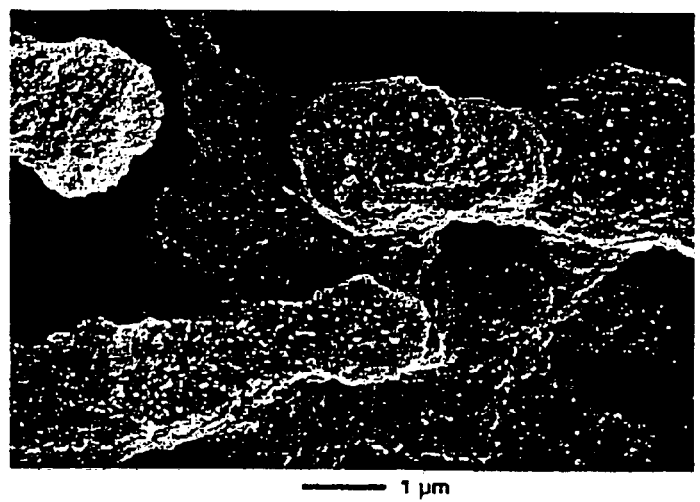
FIG. 2 shows a scanning electron microscopic photograph of the porous body obtained in Example 1.

The skeleton phase is rich in the inorganic oxide polymer produced from the inorganic low molecular weight compound by the sol-gel reaction and is also a continuous three-dimensional network phase. This phase is made of the inorganic oxide polymer adhered to the surface of the substance as the template component (more strictly, a molecular assembly of the amphiphilic substance formed by self-organization), as is evidenced by the formation of small pores (mesopores) within the skeleton phase by the subsequent removal of the template component, the amphiphilic substance (cf. FIG. 2). Thus, the oxide polymer has on its surface hydroxyl groups, which strongly interact with the proton-accepting sites on the amphiphilic substance, thereby enabling the structure of the template formed in the solution due to the self-organization to be transferred into the gel network.

As the product of the sol-gel reaction (the sol) solidifies, followed by aging for an appropriate time, and the solvent is removed by drying, the volume occupied by the solvent-rich phase becomes interconnected macropores. Then the removal of the template component, the amphiphilic substance, by thermal decomposition or extraction will produce uniformly-sized pores in the nanometer range (mesopores) formed from the self-organized structure of the template component.

The amphiphilic substance for use in the present invention as template is preferably a surface-active agent of cationic surface-active agent or nonionic surface-active agent having a hydrophilic portion such as quaternary ammonium salt as well as a hydrophobic portion typically of an alkyl group, or a block copolymer having a hydrophilic portion and a hydrophobic portion. Concrete examples include, but are not limited to, halogenated alkylammonium, polyoxyethylene alkylether, and ethylene oxide-propylene oxide-ethylene oxide block copolymer. The amphiphilic substance for use in the present invention is preferably one which can be homogeneously dissolved in the reaction solution, such as a surface-active agent or the above-exemplified block copolymer. Furthermore, as can be seen from the foregoing description, the amphiphilic substance used in the present invention not only functions, as a template, to define the diameter of nanometer-sized pores (mesopores) but also functions as a co-existent substance in the formation of the solvent-rich phase from which the macropores are produced. The amount of the template component is preferably in the range of 0.5 to 5.0 g, more preferably 1.0 to 3.0 g, the most preferably 1.5 to 2.5 g per 0.0167 moles of silicon atom (1.0 g in terms of anhydrous silica).

As inorganic low molecular weight compounds having hydrolysable functional groups, there can be used a variety of metal compounds including metal alkoxides as described in the preceding with respect to the background art. In producing porous bodies composed of silica in accordance with the preferred embodiment of the present invention, monomer or low molecular weight polymer (oligomer) of a silicon alkoxide is suitably used as the silica source. In the production of porous bodies composed of a siloxane polymer having an organic functional group or groups (organic-inorganic hybrids), there can be used, as the source of such organic-inorganic hybrid, monomer or low molecular weight polymer of silicon alkoxide having at least one silicon-carbon bond, or a compound with a structure in which two or more silicon atoms are bridged via one or more carbon atoms (e.g., bis(trialkoxysilil) alkanes). Inorganic porous bodies composed of silica in combination with a siloxane polymer having an organic functional group or groups can also be produced in accordance with the present invention.

EXAMPLES

The characteristic features of the present invention will be further clarified with reference to the following examples, but should not be construed to be limited thereto.

Example 1

Cetyltrimethylammonium bromide, a cationic surface-active agent (alkyl chain carbon number: 16, available from Tokyo-kasei) 1.10 g was dissolved in 1 mol/L nitric acid aqueous solution 9.0 g. To the resultant homogeneous solution was added tetramethoxysilane 5.15 g while stirring to carry out hydrolysis. The amount of water containing the catalyst was 4.43 g per 1.0 g of silica. After stirring for several minutes, the resulting clear solution was transferred into a closed vessel, which was thermostatted at 60° C. In some 120 minutes, the solution became turbid and then solidified.

The solidified sample was further aged for several hours, followed by removal of the solvent by evaporation at 60° C. FIG. 1 is a scanning electron microscopic image of the structure thus produced. As can be seen from the figure, there was formed a three-dimensional network structure composed of macropores (the black areas in the figure) and a skeleton phase (the white areas in the figure).

Figure 3:
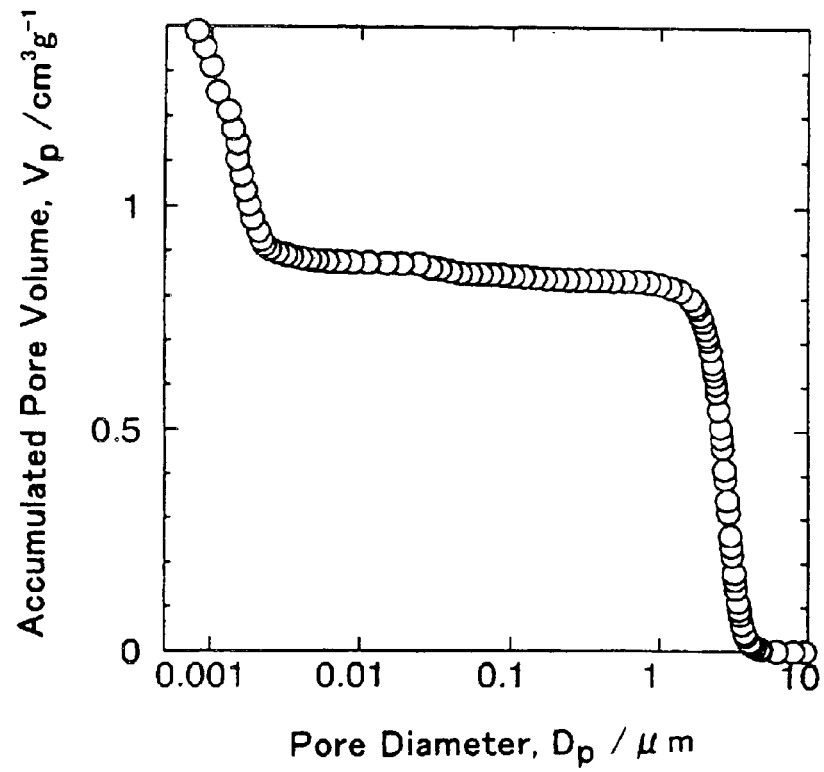
FIG. 3 is shows the pore size distribution curve, as measured by the mercury porosimetry method and the nitrogen method, of the porous body obtained in Example 1.

The dried gel was then heated up to 650° C. at the rate of 100° C./hr. Thus, there was produced a porous body composed of amorphous silica. The porous body had a three-dimensional network structure of uniformly-sized through pores (macropores) with a median diameter of 3 $\mu$m (=3000 nm) and a gel skeleton (a skeleton phase) with a width of about 2 $\mu$m, as evidenced by microscopic observation (FIG. 2) and mercury porosimetry measurement (FIG. 3). It was also ascertained by nitrogen adsorption measurement that on the inner surface of the through pores (within the skeleton phase) there were a number of small pores having a diameter of 3 nm or smaller, providing a specific surface area of larger than 400 $m^2$/g.

Example 2

Ethylene oxide-propylene oxide-ethylene oxide block copolymer (EO20-PO70-EO20, average molecular weight: 5800, Aldrich), an amphiphilic substance, 2.10 g was dissolved in 1 mol/L nitric acid aqueous solution 10.0 g. To the resultant homogeneous solution was added tetramethoxysilane 5.15 g while stirring to carry out hydrolysis. The amount of water containing the catalyst was 4.93 g per 1 g of silica. After stirring for several minutes, the resultant clear solution was transferred into a closed vessel, which was thermostatted at 40° C. In some 120 minutes, the solution became turbid and solidified.

The solidified sample was further aged for several hours, followed by removal of the solvent by evaporation at 60° C., and then heating up to 650° C. at the rate of 100° C./hr. Thus, there was obtained a porous body composed of amorphous silica.

Figure 4:
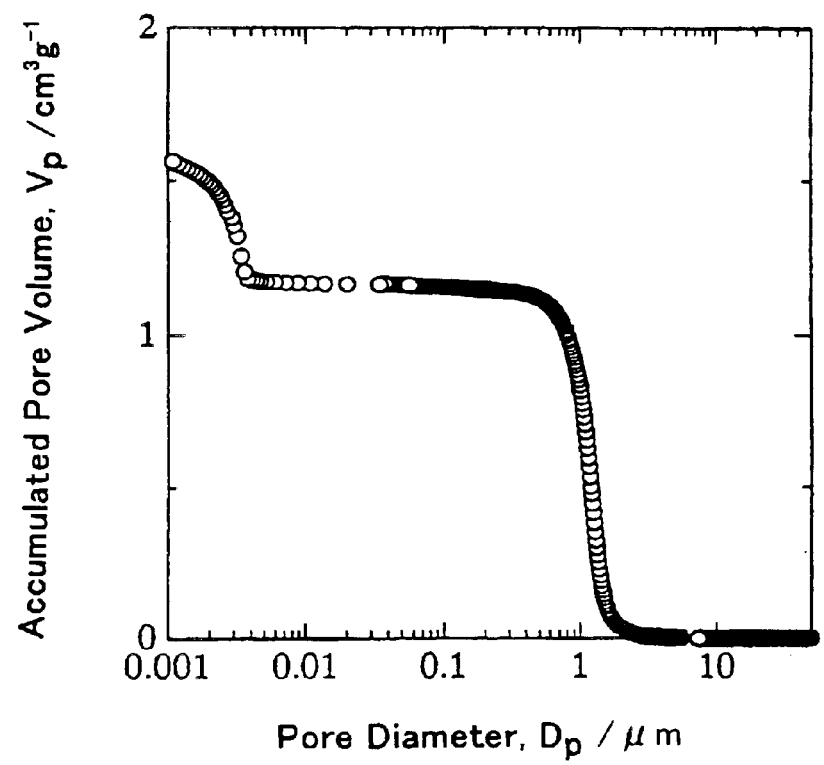
FIG. 4 shows the pore size distribution curve, as measured by the mercury porosimetry method and the nitrogen adsorption method, of the porous body obtained in Example 2 and 3 in which the preparation temperature was 40° C.

The resultant porous body had a three-dimensional network structure composed of uniformly-sized through pores with a median diameter of approx 3 $\mu$m (=3000 nm) and a gel skeleton with a width of approx 2 $\mu$m, as evidenced by microscopic observation and mercury porosimetry measurement. It was ascertained by nitrogen adsorption measurement that on the surface of the through pores there were a number of pores with a diameter distribution of mainly approx 3 nm, providing a specific surface area of larger than 400 $m^2$/g. The pore size distribution is shown in FIG. 4.

Example 3

Ethylene oxide-propylene oxide-ethylene oxide block copolymer (EO20-PO70-EO20, average molecular weight: 5800, Aldrich), an amphiphilic substance, 2.10 g was dissolved in 1 mol/L nitric acid aqueous solution 10.0 g. To the resultant homogeneous solution was added tetramethoxysilane 5.15 g while stirring to carry out hydrolysis. After stirring for several minutes, the resultant clear solution was transferred into a closed vessel, which was thermostatted at 60° C. or 80° C., and in some 60 minutes or 40 minutes, respectively, the solutions became turbid and solidified.

Figure 5:
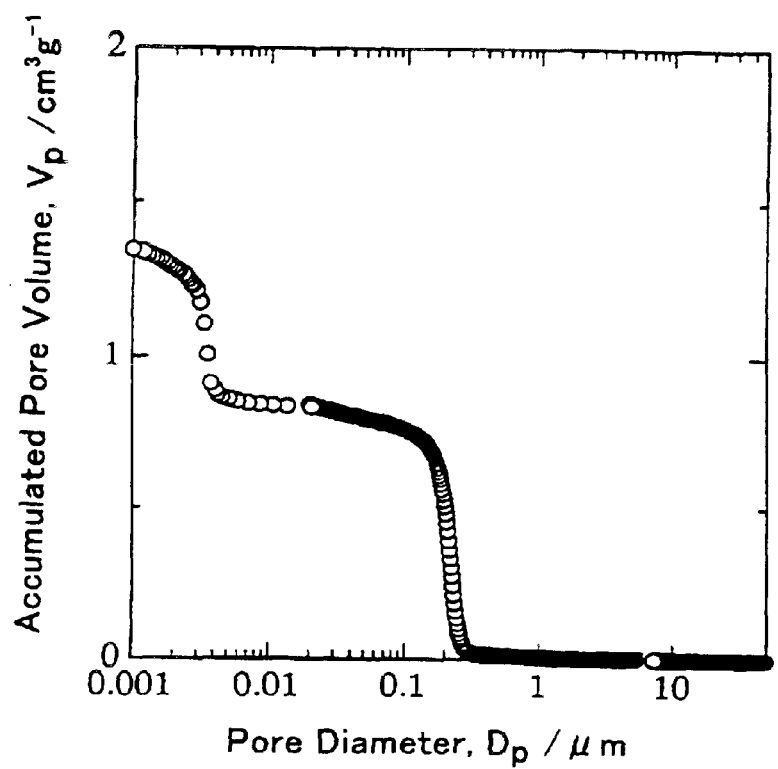
FIG. 5 shows the pore size distribution curve, as measured by the mercury porosimetry method and the nitrogen adsorption method, of the porous body obtained in Examples 2 and 3 in which the preparation temperature was 60° C.
Figure 6:
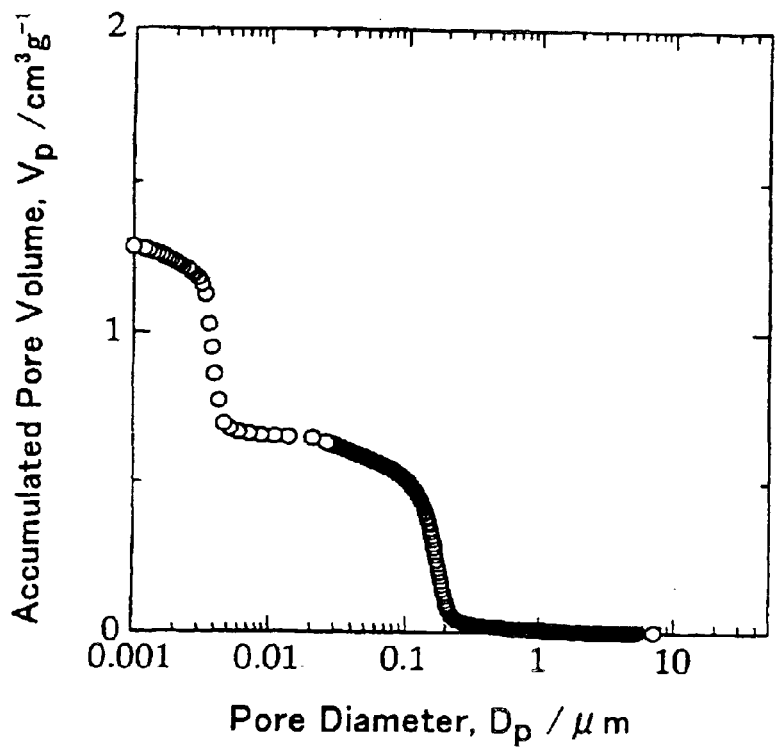
FIG. 6 shows the pore size distribution curve, as measured by the mercury porosimetry method and the nitrogen adsorption method, of the porous body obtained in Examples 2 and 3 in which the preparation temperature was 80° C.

The resultant porous bodies had a three-dimensional network structure composed of uniformly-sized through pores with a median diameter of approx 1 $\mu$m (=1000 nm) and a gel skeleton with a width of approx 1 $\mu$m, in the case where the sample was treated at 60° C., and a three-dimensional network structure composed of uniformly-sized through pores with a median diameter of approx 0.2 $\mu$m (=200 nm) and gel skeleton with a width of approx 0.2 $\mu$m, respectively, as evidenced by microscopic observation and mercury porosimetry measurement. The pore distributions are shown in FIG. 5 and FIG. 6, respectively.

Industrial Utility

As described, according to the present invention it is possible to produce porous bodies having a pore distribution controlled as desired. The porous bodies produced by the present invention have a dual pore structure composed of macropores and mesopores, and hence are applicable not only as materials for packed-type column chromatography in which the particulate porous bodies are packed in a cylinder but also as materials for integral-type column chromatography in which the porous bodies pre se constitute a column.

What is claimed is:

1. A method for producing an inorganic porous body having macropores concurrently with mesopores, which comprises the steps of:

(i) preparing a homogeneous solution by dissolving an amphiphilic substance as template component in an aqueous solution containing a sol-gel reaction catalyst, (ii) adding an inorganic low molecular weight compound having hydrolyzable functional groups to said homogeneous solution so as to cause a sol-gel reaction, thereby forming a gel of a continuous three-dimensional network structure composed of a solvent-rich phase which is rich in the solvent and a skeleton phase which is rich in an inorganic oxide polymer adhered to the surface of the amphiphilic substance wherein the inorganic oxide polymer is produced from said inorganic low molecular weight compound by the sol-gel reaction, (iii) drying said gel to remove the solvent from the solvent-rich phase by evaporation, thereby forming the macropores, and (iv) removing said template component from the dried gel by thermal decomposition or extraction, thereby forming the mesopores within the skeleton phase.

2. The method for producing an inorganic porous body as claimed in claim 1, wherein the inorganic oxide polymer is silica and/or a polymer of siloxane having an organic functional group or groups.

3. The method for producing an inorganic porous body as claimed in claim 2, wherein the sol-gel reaction is carried out under an acidic condition at least during the initial stage of the reaction, and the quantity of water containing the catalyst is in the range of 2.0 to 40.0 g per 1.0 g of silica (in terms of anhydrous silica) in the reaction system.

* * * * *